US008442545B2

(12) United States Patent
Guey et al.

(10) Patent No.: US 8,442,545 B2
(45) Date of Patent: *May 14, 2013

(54) NETWORK-WIDE INTER-CELL INTERFERENCE MINIMIZATION VIA COORDINATED MULTIPOINT CELL SCHEDULING COORDINATION (75) Inventors: Jiann-Ching Guey, Cary, NC (US); Christian Hoymann, Aachen (DE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 766 days.

This patent is subject to a terminal disclaimer.

(21) Appl. No.: 12/486,202

(22) Filed: Jun. 17, 2009

(65) Prior Publication Data
US 2010/0323712 A1 Dec. 23, 2010

(51) Int. Cl.
*H04W 72/00* (2009.01)
(52) U.S. Cl.
USPC ........ 455/452.2; 455/500; 455/501; 455/522; 455/63.1; 455/67.11; 455/67.13; 455/69; 370/317; 370/318
(58) Field of Classification Search .................. 455/501, 455/500, 522, 63.1, 67.11, 67.13, 69; 370/317, 370/318
See application file for complete search history.

(56) References Cited

U.S. PATENT DOCUMENTS

| 2008/0247375 | A1 | 10/2008 | Muharemovic et al. | |
| 2010/0027456 | A1* | 2/2010 | Onggosanusi et al. | 370/312 |
| 2010/0027471 | A1* | 2/2010 | Palanki et al. | 370/328 |
| 2010/0091893 | A1* | 4/2010 | Gorokhov | 375/260 |
| 2010/0167717 | A1* | 7/2010 | Hafeez et al. | 455/422.1 |
| 2010/0173660 | A1* | 7/2010 | Liu et al. | 455/501 |
| 2010/0261493 | A1* | 10/2010 | Guey et al. | 455/501 |
| 2010/0273514 | A1* | 10/2010 | Koo et al. | 455/501 |

OTHER PUBLICATIONS

Potevio: "Discussion of interference coordination for inter-eNB CoMP Transmission", 3GPP Draft; R1-091970 Discussion of interference Coordination for Inter-ENB CoMP Transmission, 3rd Generation Partnership Project (3GPP), Mobile Competence Centre , 650, Route Des Lucioles, F-06921 Sophia-Antipolis Cedex, France, no. San Francisco, USA; Apr. 28, 2009.
CMCC: "Application of BBU+RRU based CoMP system to LTE-Advanced", Nov. 18, 2008, 3GPP draft; RI-084612, 3rd Generation Partnership Project (3GPP), Mobile Competence Centre, 650, Route Des Lucioles ; F-06921 Sophia-Antipolis Cedex ; France, XP050317843.

(Continued)

Primary Examiner — Nimesh Patel (57) ABSTRACT

Network-wide inter-cell interference is reduced by aggregating cells (herein, sub-cells) into Coordinated MultiPoint (CoMP) cells, each having a controller. The CoMP cells are divided into sets, similar to a frequency reuse plan. Scheduling information regarding transmissions scheduled to and from UEs in one set of CoMP cells is transmitted to controllers in sets of neighboring CoMP cells, in advance of the transmissions. Controllers in the receiving sets of CoMP cells schedule transmission to minimize both inter-sub-cell interference and interference with the set of CoMP cells that transmitted the scheduling information, and assuming no interference from other CoMP cells. They then transmit scheduling information to subsequent set(s) of CoMP cells. The order of scheduling information transmission between sets of CoMP cells may be rotated for fairness. The scheduling information may range from bare threshold data indicating at least one transmission, to detailed information such as estimated path gains to each UE.

24 Claims, 5 Drawing Sheets

OTHER PUBLICATIONS

ETRI: "Multi-cell PMI coordination for downlink CoMp", 3GPP Draft; R1-091490 PMI Coordination, 3rd Generation Partnership Project (3GPP), Mobile Competence Centre ; 650, Route Des Lucioles; F-06921 Sophia-Antipolis Cedex; France, no. Seoul, Korea; Mar. 19, 2009.

Ericsson Contribution, "On Inter-cell Interference Coordination Schemes without/with Traffic Load Indication," 3GPP TSG-RAN WG1 R1-072456, entire document (May 7-11, 2007).

* cited by examiner

|  | SUB-CELLS IN<br>RED CoMP CELL | | | SUB-CELLS IN<br>BLUE CoMP CELL | | | SUB-CELLS IN<br>YELLOW CoMP CELL | | |
|---|---|---|---|---|---|---|---|---|---|
| UEs ATTACHED TO<br>RED CoMP CELL | $g_{11}$ | $G_{12}$ | $g_{13}$ | $g_{14}$ | $g_{15}$ | $G_{16}$ | $g_{17}$ | $g_{18}$ | $g_{19}$ |
|  | $(G_{21})$ | $g_{22}$ | $g_{23}$ | $g_{24}$ | $g_{25}$ | $g_{26}$ | $g_{27}$ | $g_{28}$ | $g_{29}$ |
|  | $G_{31}$ | $G_{32}$ | $g_{33}$ | $g_{34}$ | $G_{35}$ | $g_{36}$ | $g_{37}$ | $g_{38}$ | $g_{39}$ |
|  | $g_{41}$ | $(G_{42})$ | $g_{43}$ | $g_{44}$ | $g_{45}$ | $g_{46}$ | $g_{47}$ | $g_{48}$ | $g_{49}$ |
|  | $g_{51}$ | $g_{52}$ | $g_{53}$ | $g_{54}$ | $G_{55}$ | $G_{56}$ | $g_{57}$ | $g_{58}$ | $g_{59}$ |
| UEs ATTACHED TO<br>BLUE CoMP CELL | $G_{61}$ | $g_{62}$ | $g_{63}$ | $g_{64}$ | $g_{65}$ | $g_{66}$ | $g_{67}$ | $g_{68}$ | $g_{69}$ |
|  | $g_{71}$ | $G_{72}$ | $g_{73}$ | $g_{74}$ | $g_{75}$ | $g_{76}$ | $g_{77}$ | $g_{78}$ | $g_{79}$ |
|  | $g_{81}$ | $g_{82}$ | $g_{83}$ | $g_{84}$ | $(G_{85})$ | $g_{86}$ | $g_{87}$ | $g_{88}$ | $g_{89}$ |
|  | $g_{91}$ | $g_{92}$ | $g_{93}$ | $g_{94}$ | $g_{95}$ | $(G_{96})$ | $g_{97}$ | $g_{98}$ | $g_{99}$ |

NETWORK-WIDE INTER-CELL INTERFERENCE MINIMIZATION VIA COORDINATED MULTIPOINT CELL SCHEDULING COORDINATION

TECHNICAL FIELD

The present invention relates generally to wireless cellular communications, and in particular to a system and method of mitigating inter-cell interference by the advance exchange of scheduling information among Coordinated MultiPoint cells.

BACKGROUND

Wireless cellular communication networks are nearly ubiquitous, and provide mobile voice and data communications to millions of subscribers. In a cellular network, a fixed transceiver (base station, Node B, etc.) provides two-way radio communications with a plurality of subscribers within a geographic area, or cell (as used herein, the term sector is synonymous with cell). Methods of suppressing intra-cell radio interference, such as time-division, frequency-division, and code-division multiplexing, and combinations thereof, are known in the art. Additionally, methods of suppressing inter-cell interference, such as frequency reuse patterns, are known in the art. In modern wireless cellular communication networks, inter-cell interference remains the dominant source of performance impairment, restricting data rates, system capacity, and the quality of delivered communication services.

Coordinated multipoint (CoMP) is a technology to minimize inter-cell interference. A plurality of geographically contiguous cells—referred to as sub-cells—are grouped together to form a CoMP cell. Each CoMP cell has a central controller that coordinates transmission within its constituent sub-cells so as to minimize inter-cell interference within the CoMP cell (referred to herein as inter-sub-cell interference). The CoMP cell controller minimizes inter-sub-cell interference by coordinating scheduling of transmissions to and from user equipment (UE) within the cells, and/or actively suppressing interference using signal processing techniques.

Figure 1:
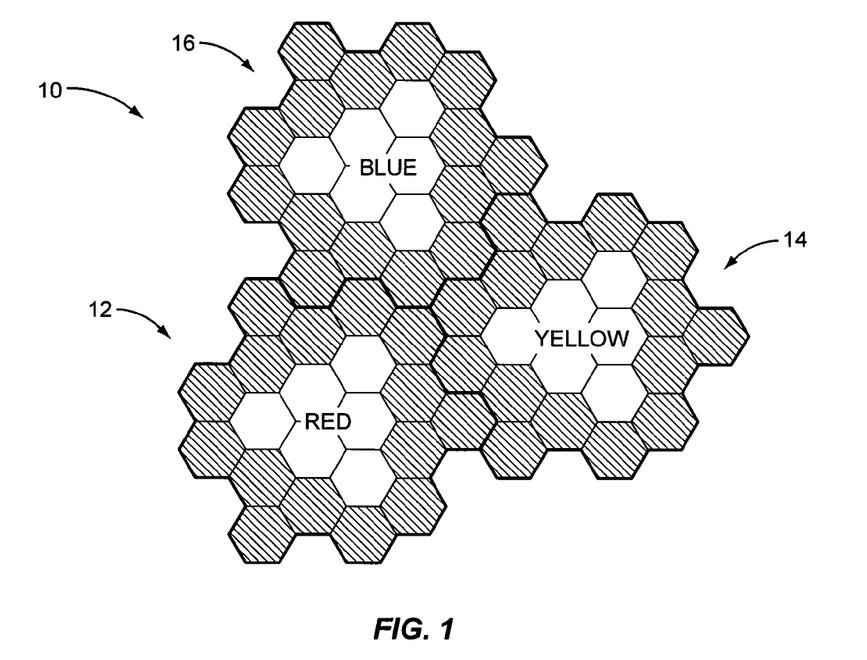
FIG. 1 is a functional diagram of three CoMP cells, depicting interference in the border sub-cells of each.

Although the CoMP system can be effective in minimizing inter-sub-cell interference, the inter-CoMP-cell interference still exists in both the uplink and downlink along the joined areas between neighboring CoMP cells. FIG. 1 depicts a network 10 divided into three contiguous CoMP cells, identified for the purpose of discussion herein as the Red CoMP cell 12, Yellow CoMP cell 14, and Blue CoMP cell 16. The border sub-cells in each CoMP cell 12, 14, 16 are depicted as hatched lines. These border sub-cells may experience interference from transmissions in the border sub-cells of neighboring CoMP cells, as no coordination exists between the CoMP cells 12, 14, 16. In effect, the performance-limiting interference is merely pushed out toward the boundary of the CoMP cells 12, 14, 16. One hypothetical solution to this problem would be to connect all sub-cells to a single central unit, and coordinate transmissions and/or suppress interference over all cells in a network 10 simultaneously. However, this is not feasible in practice, especially for large networks.

SUMMARY

According to one or more embodiments described and claimed herein, scheduling information regarding downlink and uplink transmissions scheduled to and from UEs in one set of CoMP cells is transmitted to controllers in one or more sets of neighboring CoMP cells, in advance of the transmissions. The CoMP cells in the same set can schedule UEs independently, since they are geographically isolated and hence do not cause interference with each other. The first set of CoMP cells schedule transmissions to minimize intra-CoMP cell interference, assuming no inter-CoMP cell interference from any neighboring CoMP cells, and transmit scheduling information to neighboring sets of CoMP cells. A second set of CoMP cells receiving the scheduling information then schedule transmissions to minimize both intra-CoMP cell interference internally, and inter-CoMP cell interference with the first sets of CoMP cells, assuming no inter-CoMP cell interference from subsequent sets of CoMP cells. The second set of CoMP cells in turn transmit scheduling information to a third set of CoMP cells, and so on. The scheduling information may include a variety of information related to scheduled transmissions.

One embodiment relates to a method of reducing interference in a wireless communication network. The wireless communication network comprises a plurality of sub-cells, and the sub-cells grouped into two or more CoMP cells. Each CoMP cell comprises a controller operative to manage transmissions within the sub-cells comprising the CoMP cell, to minimize intra-CoMP cell interference. Transmissions to and from UEs within a first CoMP cell are scheduled by a first CoMP cell controller. Scheduling information regarding transmissions scheduled to and from UE in sub-cells at the border of the first CoMP cell is transmitted from the first CoMP cell controller to a second controller of a neighboring second CoMP cell, in advance of the transmissions.

DETAILED DESCRIPTION

Figure 2A:
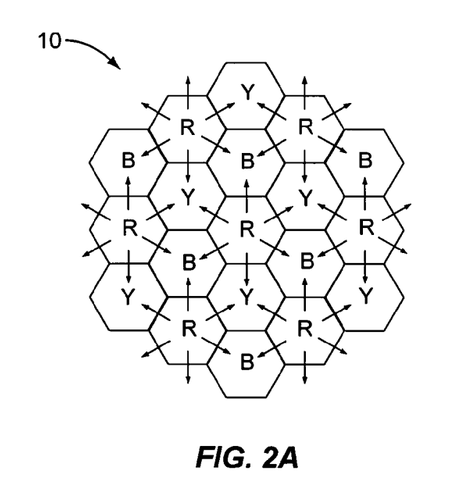
FIG. 2A depicts the Red (R) CoMP cells transmitting information to neighboring Blue (B) and Yellow (Y) CoMP cells.
Figure 2B:
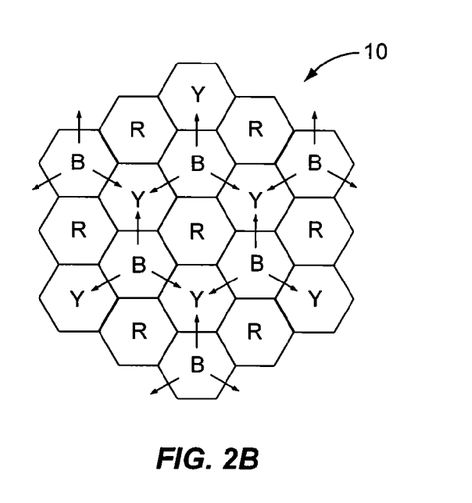
FIG. 2B depicts the Blue (B) CoMP cells transmitting information to neighboring Yellow (Y) CoMP cells.

FIG. 2 depicts two larger views of the network 10. The network 10 is divided into CoMP cells, each comprising a plurality of sub-cells (not shown). The CoMP cells are grouped into sets, depicted by the colors Red (R), Blue (B), and Yellow (Y) CoMP cells. The CoMP cell set groupings are geographically dispersed, similar to a traditional cellular network frequency reuse pattern, to geographically separate all CoMP cells of each set, or color. Due to this separation, transmission to UEs in each set, or color, of CoMP cells may be independently scheduled, since they do not cause interference to each other.

Beginning with one set of CoMP cells, such as the Red cells in FIG. 2, transmissions to UEs in the Red CoMP cells are scheduled to minimize inter-sub-cell interference, under the assumption that border sub-cells in the neighboring Blue and Yellow CoMP cells cause no interference. The Red CoMP cell controllers then transmit scheduling information to controllers in their neighboring Blue and Yellow CoMP cells, as indicated by the outgoing arrows in FIG. 1. The scheduling information, described more fully herein, assists the receiving CoMP cells (e.g., Blue and Yellow) to schedule transmissions to UEs in their sub-cells without exceeding desired interference levels.

For example, upon receiving this scheduling information from the Red CoMP cell controllers, the e.g. Blue CoMP cell controllers then schedule transmissions to UEs in their sub-cells to minimize inter-sub-cell interference, and additionally using the scheduling information to avoid causing interference to UEs scheduled in the neighboring Red CoMP cell border sub-cells, and assuming that UEs in the Yellow CoMP cells cause no interference. The Blue CoMP cell controllers then transmit scheduling information to their neighboring Yellow CoMP cells, as depicted in FIG. 2B.

Upon receiving the scheduling information from the Blue CoMP cell controllers, and having earlier received scheduling information from the Red CoMP cell controllers, the Yellow CoMP cell controllers then schedule transmissions to UEs in their sub-cells to minimize inter-sub-cell interference, and additionally using both sets of scheduling information to avoid causing interference to UEs scheduled to receive transmissions in the border sub-cells of the neighboring Red and Blue CoMP cells.

Although embodiments of the invention are described herein using only three sets of CoMP cells (denoted Red 12, Yellow 14, and Blue 16), those of skill in the art will readily recognize that any number of sets may be defined. In the case of more than three, the process continues—that is, in the example above, after scheduling its UEs to avoid interference to UEs in Red and Blue CoMP cells, the Yellow CoMP cell controllers would transmit scheduling information to the next set, e.g., Green CoMP cell controllers, who would then schedule UEs in their own sub-cells to avoid interference to the Red, Blue, and Yellow CoMP cells, and so on.

All scheduling must be completed in advance of the radio transmission to UEs in sub-cells. Accordingly, all transmissions of scheduling information must be completed sufficiently in advance of the radio transmissions to allow for all downstream scheduling (and, if applicable, subsequent scheduling information transmission and scheduling) to also complete prior to radio transmissions. Many wireless cellular communication system protocols define a periodic transmission duration, which may be known as a frame or sub-frame, time slot, transmission time interval (TTI), or the like. In such systems, all scheduling information transmission should be completed sufficiently in advance of the transmission duration to allow the final CoMP cell set (e.g., Yellow in the example above) to complete its scheduling.

Figure 3:
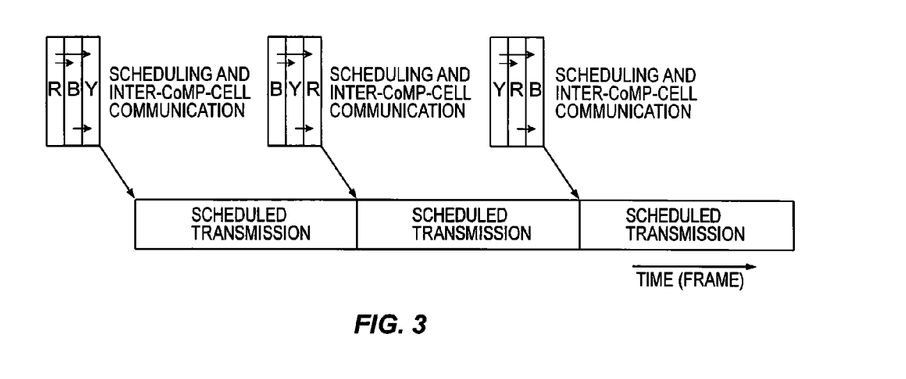
FIG. 3 is a logical diagram of successive predefined durations of scheduled transmissions, with a rotating order of inter-CoMP-cell communication proceeding each transmission duration.

For fairness, the order of scheduling information transmission may be rotated among the CoMP cell sets according to a predetermined scheme. FIG. 3 depicts a round-robin rotation of scheduling information transmission priority among the Red, Yellow, and Blue CoMP cells. Other rotation schemes within the scope of the present invention include rotation based on current or recent past scheduling activity (i.e., the CoMP cell sets having the high traffic load have the first scheduling priority). Additionally, a priority-based rotation scheme may be combined with a fairness component, such as in the proportional fairness scheme utilized in high speed packet downlink channels of some wireless network protocols. In general, within the scope of the present invention, the priority of scheduling information transmission among plural sets of CoMP cells may be determined according to any scheduling protocol that achieves desirable network performance goals. Of course, such protocols are not limited to operation with only three sets of CoMP cells.

The scheduling information passed between different sets of CoMP cells should help the receiving CoMP cells schedule transmissions to/from UEs in their sub-cells without exceeding a desired interference level.

Figure 4:
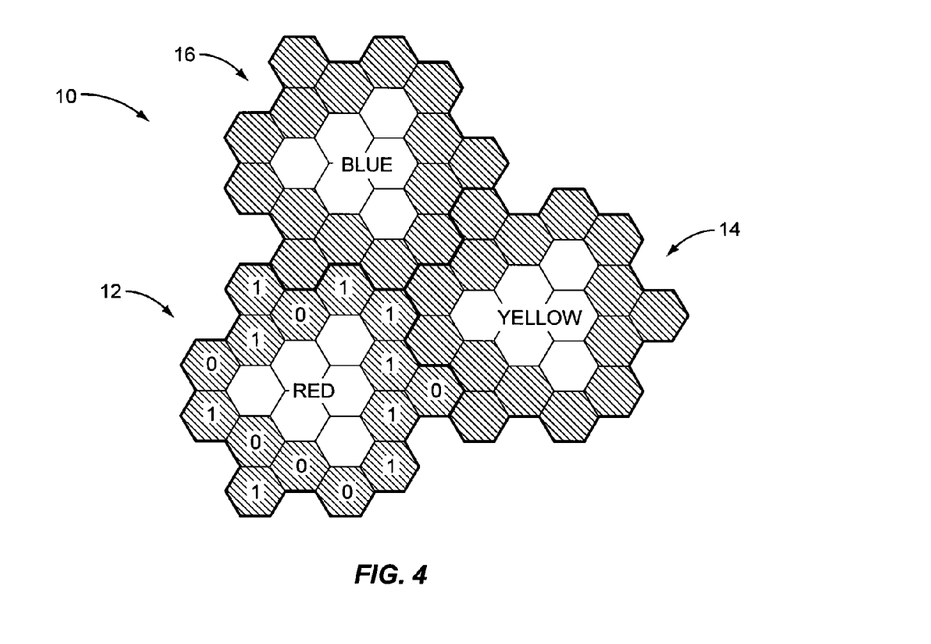
FIG. 4 depicts single-bit scheduling information representing scheduled transmission activity at the border cells of the Red CoMP cell.

In one embodiment, the scheduling information comprises simply an indicator whether any transmissions are scheduled in a border sub-cell, for a future predefined duration such as a frame. FIG. 4 depicts the scheduling information transmitted by a Red CoMP cell 12 controller to controllers in the neighboring Yellow and Blue CoMP cells 14, 16. The indicator may be as simple as a single binary bit, for example, with zero indicating no transmissions, and one indicating one or more transmissions, scheduled within the relevant sub-cell. With these active/inactive indicators, the Yellow and Blue CoMP cells 14, 16 can schedule transmissions to their UEs to avoid generating interference to UEs in the Red CoMP cell 12.

In one embodiment, scheduling information related to the interior sub-cells (i.e., non-border sub-cells) need not be communicated, since they cause little interference with transmissions in the Yellow and Blue CoMP cells 14, 16. In other embodiments, for example where the border sub-cells are small, or where for other reasons transmissions to UEs in the Yellow or Blue CoMP cells 14, 16 may be interfered by transmissions to UEs in non-border sub-cells of the Red CoMP cell 12, the Red CoMP cell 12 controller may include the interior sub-cells in the scheduling information transferred to other CoMP cells 14, 16.

In the embodiment of FIG. 4, the amount of data to be transferred as scheduling information is minimized; however the receiving CoMP cells 14, 16 have only threshold knowledge of transmissions in the broadcasting CoMP cell 12.

In other embodiments, more extensive information regarding transmissions to UEs in the, e.g., Red CoMP cell 12 border sub-cells is transmitted to the Yellow and Blue CoMP cells 14, 16, allowing the receiving CoMP cells 14, 16 to make more sophisticated UE transmission decisions while still mitigating inter-CoMP cell interference. In one embodiment, the scheduling information includes the path gain associated with one or more UE transmissions. A gain matrix of path gains for transmissions in all of a CoMP cell's border sub-cells is:

$$G = \begin{bmatrix} g_{11} & g_{12} & \cdots & \cdots & g_{1N} \\ g_{21} & g_{22} & \cdots & \cdots & g_{2N} \\ \vdots & \vdots & \ddots & & \vdots \\ \vdots & \vdots & & \ddots & \vdots \\ g_{M1} & g_{M2} & \cdots & \cdots & g_{MN} \end{bmatrix},$$

where $g_{mn}$ is the path gain between the $m^{th}$ UE and the $n^{th}$ sub-cell. Of course, in appropriate environments, the matrix G may be extended to include gain elements associated with transmissions in non-border sub-cells of a CoMP cell.

Figure 5:
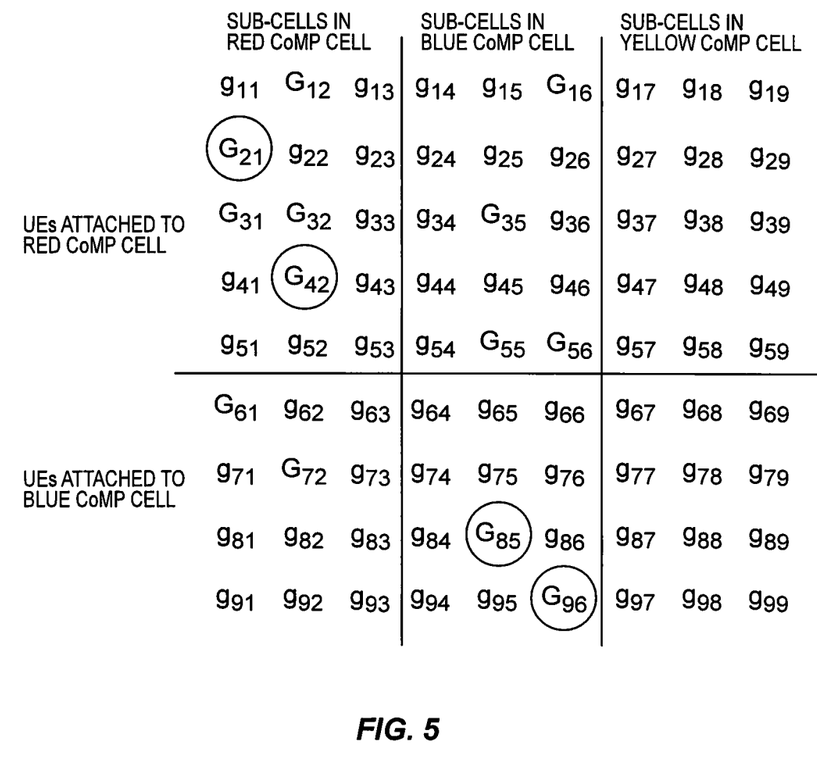
FIG. 5 is a representative matrix of path gains, grouped by CoMP cells.

FIG. 5 depicts a representative example of a gain matrix grouped by CoMP cells. For the downlink, the interference that a UE experiences is the sum of the active elements in its row minus the element corresponding to its serving sub-cell. For the uplink, on the other hand, the interference is summed along the column index. A circled element indicates the correspondence between a scheduled UE and its serving sub-cell. The dominant path gains are denoted with a capital G; a lower-case g indicates a much smaller gain. The sub-cells are numbered consecutively (i.e., sub-cell numbering does not restart within each CoMP cell).

Consider the case where the Red CoMP cell 12 has scheduled its UEs on the downlink and needs to pass that scheduling information to the neighboring Blue CoMP cell 16. Assume that the Red CoMP cell 12 has scheduled transmissions to $UE_2$ in sub-cell 1 and $UE_4$ in sub-cell 2. The Red CoMP cell 12 needs to include in its scheduling information, the gain elements $\{g_{21}, g_{22}, g_{41}, g_{42}\}$, so that the Blue CoMP cell 16 can avoid causing interference to these two UEs. If $g_{22}$ and $g_{41}$ are much smaller than $g_{21}$ and $g_{42}$ respectively, they can be omitted.

In addition, the Red CoMP cell 12 also needs to include the gain elements $\{g_{61}, g_{71}, g_{81}, g_{91}\}$ and $\{g_{62}, g_{72}, g_{82}, g_{92}\}$ in its scheduling information. These are the estimated path gains to Blue CoMP cell UEs, caused by transmissions to UEs in the Red CoMP cell's sub-cells 1 and 2, respectively. This information allows the Blue CoMP cell 16 to schedule transmissions in its own sub-cells accordingly. Of these, only the dominant elements $\{g_{61}\ g_{72}\}$ need be included. Path gains tend to change slowly, and hence may not need to be included in scheduling information transmitted prior to each predefined transmission duration (e.g., frame). On the other hand, the transmission scheduling, as described with respect to the embodiment of FIG. 4, changes from frame to frame, and should always be included in the scheduling information transmitted between CoMP cells 12, 14, 16.

Figure 6:
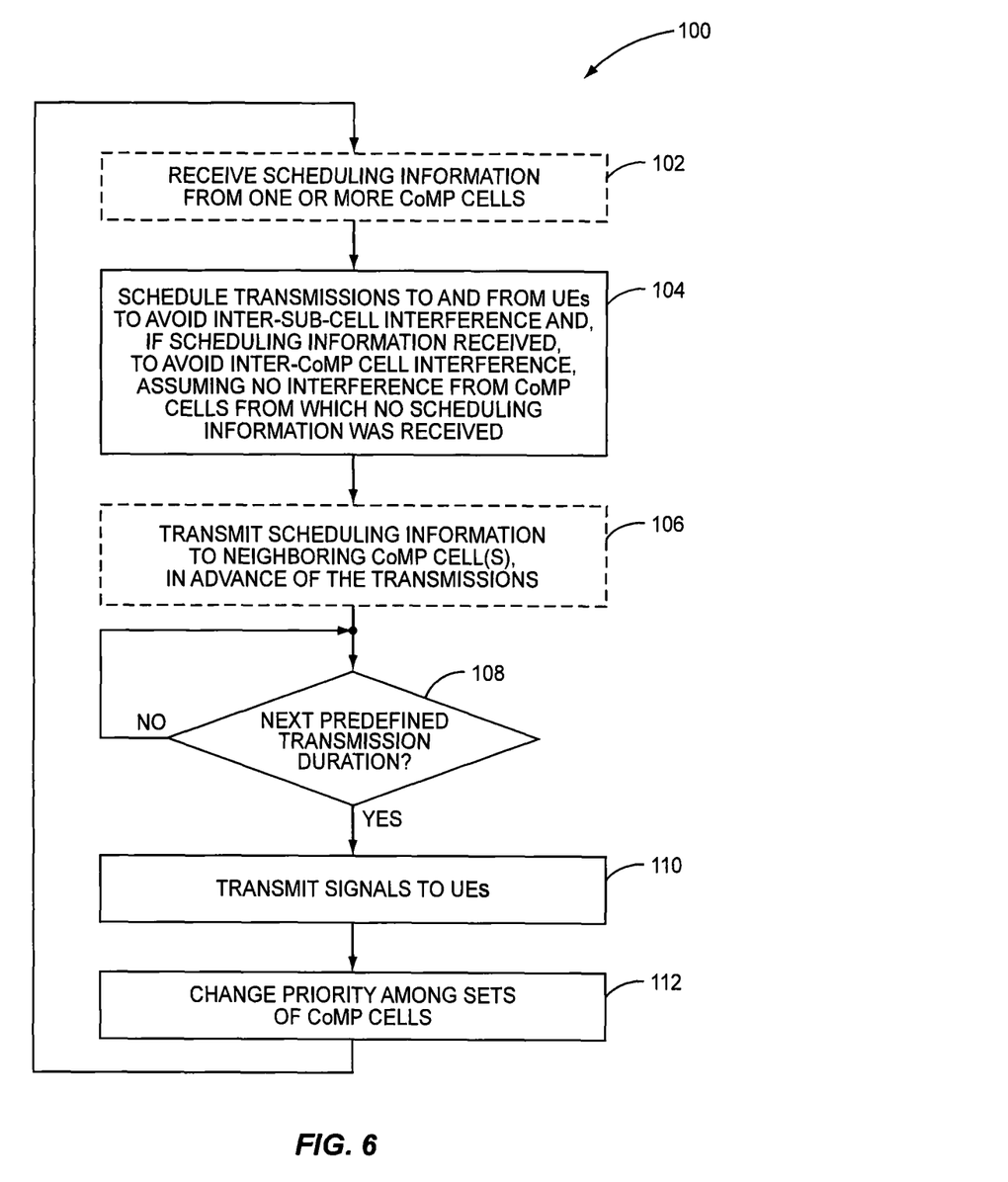
FIG. 6 is a flow diagram of a method of inter-CoMP cell interference reduction.

FIG. 6 depicts a method 100, performed by a CoMP cell controller, of reducing interference in a wireless communication network 10. If, for a particular predetermined transmission duration (e.g., frame), the CoMP cell controller is not the first priority in transferring scheduling information, the method 100 begins, in advance of any transmissions to or from UEs, at block 102, where the CoMP cell controller receives scheduling information from one or more neighboring CoMP cells. Then, at block 104—or, if the CoMP cell controller is the first priority in transferring scheduling information for this transmission duration, beginning with block 104—the CoMP cell controller schedules transmissions to and from UEs within its CoMP cell to avoid or minimize inter-sub-cell interference. If it has received scheduling information from at least one neighboring CoMP cell (block 102), the controller also schedules transmissions to avoid or minimize inter-CoMP-cell interference with the CoMP cells from which it received scheduling information. In either case, the CoMP cell controller assumes there will be no interference from neighboring CoMP cells from which no scheduling information was received.

If, for this transmission duration, the CoMP cell controller is not the last to receive scheduling information, then at block 106 it transmits its own scheduling information to downstream neighboring CoMP cells, in advance of any transmissions to or from UEs. The sub-cell transceivers then communicate with their UEs as scheduled. At the next predefined transmission duration (block 108), each CoMP cell transmits signals to and from its UEs according to the scheduling performed in block 104 (block 110). The priority among sets of CoMP cells may then be changed (block 112), and the method repeats—possibly omitting blocks 102 or 106 if, for the new transmission duration, the CoMP cell controller becomes the first or last priority, respectively, in transmitting its scheduling information.

By successively transmitting scheduling information from one CoMP cell to another, with the receiving CoMP cell using the scheduling information to schedule transmissions to its own UEs, inter-CoMP cell interference may be significantly reduced. The interference reduction may approximate that theoretically achievable with network-wide transmission coordination, without the need for a central network controller and real-time communication with every CoMP cell in the network. The scheduling information exchanged between CoMP cells is limited, and in some embodiments is minimal.

Figure 7:
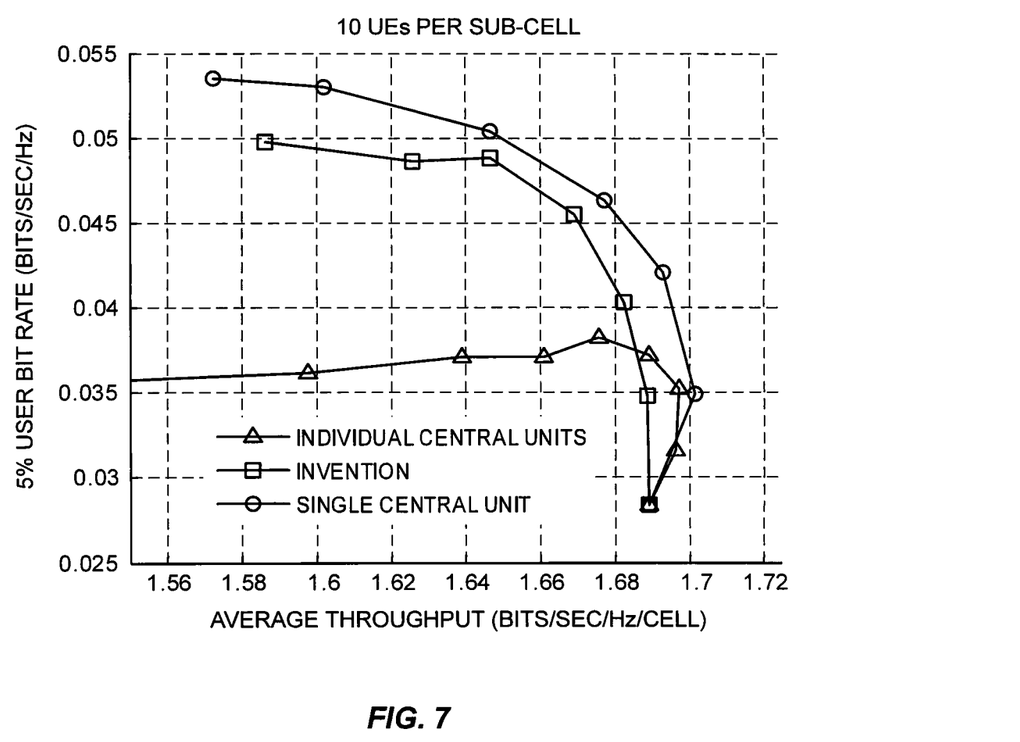
FIG. 7 is a graph of simulation results.

FIG. 7 graphs the results of system simulations of a network 10 modeled as depicted in FIG. 2. Each CoMP cell comprises 21 sub-cells, as depicted in FIG. 1. Wrapping-around of three CoMP cells 12, 14, 16 emulates an infinite and borderless network 10. On average, there are 10 UEs in each sub-cell with full-buffer data. FIG. 6 graphs the $5^{th}$ percentile user data rate, plotted against the average throughput per CoMP cell.

The curve marked by triangles corresponds to the baseline solution in which each CoMP cell 12, 14, 16 schedules its own UEs independently, resulting in inter-CoMP cell interference. The curved marked by circles is the theoretically optimal (but unrealistic) solution in which a single decision-making central controller coordinates transmissions among all sub-cells in the network 10. The curve depicting results for the second embodiment of the invention—wherein scheduling information comprises dominant path gains—is marked by squares. This curve shows only a small degradation with respect to the optimal solution.

As used herein, the term "scheduling information" refers to any information related to wireless communication transmissions scheduled between one or more network transceivers and one or more UEs. Scheduling information may relate to the timing of such transmission, and/or may include other information such as the path gain associated with one or more such transmissions. The granularity of scheduling information may vary from per-UE to per-sub-cell or even per-CoMP-cell, or any other grouping useful for interference mitigation according to embodiments of the present invention.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of reducing interference in a wireless communication network comprising a plurality of sub-cells, the sub-cells grouped into two or more Coordinated MultiPoint (CoMP) cells wherein each CoMP cell comprises a plurality of contiguous sub-cells and a controller operative to manage transmissions within the sub-cells of the CoMP cell to minimize intra-CoMP cell interference, the method comprising the steps of:

scheduling, by a first CoMP cell controller, transmissions to and from user equipments (UEs) within a first CoMP cell;

transmitting, from the first CoMP cell controller to a second controller of a neighboring second CoMP cell, scheduling information regarding transmissions scheduled to and from UEs in sub-cells at the border of the first CoMP cell, in advance of the transmissions; and scheduling, by the second CoMP cell controller, transmissions to and from UEs within the second CoMP cell utilizing the scheduling information transmitted by the first CoMP cell controller to minimize inter-CoMP cell interference between the first and second CoMP cells.

2. The method of claim 1, wherein the scheduling information comprises an indication whether any transmission is scheduled to and from any UE in each border sub-cell.

3. The method of claim 1, wherein the first CoMP cell belongs to a first set of non-contiguous CoMP cells and the second CoMP cell belongs to a second set of non-contiguous CoMP cells, the CoMP cells of each set distributed through the network such that no transmissions from any CoMP cell within a particular set cause interference to any other CoMP cell in that set.

4. The method of claim 2, wherein the indication comprises a single bit per border sub-cell.

5. The method of claim 1, wherein the scheduling information comprises an estimate of the path gain to a UE of a transmission scheduled to or from that UE.

6. The method of claim 5, wherein the scheduling information further comprises an estimate of the path gain to a UE of a transmission scheduled to or from a different UE.

7. The method of claim 6, wherein the scheduling information comprises the path gain estimates that exceed a predetermined threshold.

8. The method of claim 6, wherein the path gain estimates are in the form of an m×n matrix, where m is an index identifying UEs and n is an index identifying sub-cells.

9. The method of claim 1, wherein the scheduling information comprises information regarding transmissions scheduled to occur during a future predefined transmission duration.

10. The method of claim 1, further comprising:
receiving, at the first CoMP cell controller, from the second CoMP cell controller, scheduling information regarding transmissions scheduled to and from UEs in sub-cells of the second CoMP cell, in advance of the transmissions.

11. The method of claim 10, wherein the scheduling information comprises information regarding transmissions scheduled to occur during a future predefined duration other than a duration for which the first CoMP cell controller transmitted scheduling information regarding transmissions scheduled to and from UEs in sub-cells at the border of the first CoMP cell.

12. The method of claim 11, further comprising:
scheduling, by the first CoMP cell controller, transmissions to and from UEs in the first CoMP cell, considering the received scheduling information, so as to minimize interference to UEs in the second CoMP cell, during the predefined duration to which the received information about the second CoMP cell pertains.

13. A Coordinated MultiPoint (CoMP) cell controller communicatively linked to a plurality of network transceivers, each transceiver providing radio communications to User Equipments (UEs) in a sub-cell of the CoMP cell, comprising:
a scheduler for scheduling transmissions with UEs in sub-cells of the CoMP cell to minimize inter-sub-cell interference within the CoMP cell, wherein the scheduler generates scheduling information; and
a communication interface for transmitting to one or more controllers of neighboring CoMP cells, scheduling information generated by the scheduler regarding transmissions scheduled to and from UEs in sub-cells at the border of the CoMP cell, in advance of the transmissions.

14. The CoMP cell controller of claim 13, wherein the controller includes means for receiving over the communication interface, scheduling information regarding transmissions scheduled to and from UEs in sub-cells at the border of one or more neighboring CoMP cells, in advance of the transmissions, and wherein the scheduler utilizes the received scheduling information to schedule transmissions with UEs in sub-cells of the CoMP cell to minimize interference with UEs in the one or more neighboring CoMP cells.

15. The CoMP cell controller of claim 14, wherein a relative order in which the controller transmits or receives scheduling information, changes for each predefined transmission duration according to a predetermined protocol.

16. The CoMP cell controller of claim 13, wherein the scheduling information comprises an indication whether any transmission is scheduled to or from any UE in each border sub-cell.

17. The CoMP cell controller of claim 16, wherein the indication comprises a single bit per border sub-cell.

18. The CoMP cell controller of claim 13, wherein the scheduling information comprises an estimate of the path gain to a UE of a transmission scheduled to or from that UE.

19. The CoMP cell controller of claim 18, wherein the scheduling information further comprises an estimate of the path gain to a UE of a transmission scheduled to or from a different UE.

20. The CoMP cell controller of claim 18, wherein the scheduling information comprises the path gain estimates that exceed a predetermined threshold.

21. The CoMP cell controller of claim 19, wherein the path gain estimates are in the form of an m×n matrix where m is an index identifying UEs and n is an index identifying sub-cells.

22. A method of reducing inter-cell interference within a Coordinated Multi-Point (CoMP) cellular network architecture having a plurality of CoMP cells, wherein each CoMP cell includes a plurality of sub-cells in which radio transmissions are made to and from User Equipments (UEs), said method comprising the steps of:
grouping the plurality of CoMP cells into a number of mutually exclusive subsets, wherein the CoMP cells in each subset are sufficiently separated from each other geographically so that no inter-CoMP-cell interference occurs among the CoMP cells in any given subset;
scheduling transmissions to and from UEs in the sub-cells of the CoMP cells in a first subset to minimize intra-CoMP-cell interference among the sub-cells within the CoMP cells in the first subset;
passing scheduling information from each of the CoMP cells in the first subset to neighboring CoMP cells in all other subsets; and
scheduling transmissions to and from UEs in the sub-cells of the CoMP cells in a second subset, wherein transmissions in the second subset are scheduled to minimize intra-CoMP-cell interference among the sub-cells within the CoMP cells in the second subset, and wherein transmissions in the second subset are also scheduled utilizing the scheduling information received from the first subset to minimize inter-CoMP-cell interference with CoMP cells in the first subset.

23. The method according to claim 22, further comprising the steps of:
passing scheduling information from each of the CoMP cells in the second subset to neighboring CoMP cells in all other subsets except the first subset; and
scheduling transmissions to and from UEs in the sub-cells of the CoMP cells in a third subset, wherein transmissions in the third subset are scheduled to minimize intra-CoMP-cell interference among the sub-cells within the CoMP cells in the third subset, and wherein transmissions in the third subset are also scheduled utilizing the scheduling information received from the first and second subsets to minimize inter-CoMP-cell interference with CoMP cells in the first and second subsets.

24. A system in a cellular communication network for minimizing inter-cell interference among Coordinated MultiPoint (CoMP) cells, the system comprising:
- a first CoMP cell controller communicatively linked to a first plurality of network transceivers, each transceiver providing radio communications to User Equipments (UEs) in a sub-cell of the CoMP cell;
- a second CoMP cell controller communicatively linked to a second plurality of network transceivers neighboring the first plurality of network transceivers;
- wherein the first and second CoMP cell controllers include:
  - a scheduler for scheduling transmissions with UEs in sub-cells of the first and second CoMP cells, respectively, to minimize inter-sub-cell interference within the first and second CoMP cell, wherein the schedulers generate scheduling information; and
  - a communication interface for transmitting from the first CoMP cell controller to the second CoMP cell controller, scheduling information generated by the scheduler of the first CoMP cell controller regarding transmissions scheduled to and from UEs in sub-cells at the border of the first CoMP cell, in advance of the transmissions;
  - wherein the scheduler of the second CoMP cell controller includes means for utilizing the scheduling information transmitted by the first CoMP cell controller to schedule transmission to and from UEs in the in sub-cells at the border of the second CoMP cell so as to minimize inter-CoMP cell interference between the first CoMP cell and the second CoMP cell.

\* \* \* \* \*

UNITED STATES PATENT AND TRADEMARK OFFICE
CERTIFICATE OF CORRECTION

PATENT NO. : 8,442,545 B2  
APPLICATION NO. : 12/486202  
DATED : May 14, 2013  
INVENTOR(S) : Guey et al.

Page 1 of 1

It is certified that error appears in the above-identified patent and that said Letters Patent is hereby corrected as shown below:

In the Specification:

In Column 5, Line 21, delete "$\{g_{61}\ g_{72}\}$" and insert -- $\{g_{61},\ g_{72}\}$ --, therefor.

In the Claims:

In Column 9, Line 27, in Claim 24, delete "in the in" and insert -- in the --, therefor.

Signed and Sealed this  
Thirteenth Day of August, 2013

Teresa Stanek Rea  
*Acting Director of the United States Patent and Trademark Office*